(12) United States Patent
Jiang

(10) Patent No.: US 12,228,787 B2
(45) Date of Patent: Feb. 18, 2025

(54) MULTI-LENS ASSEMBLY, CAMERA MODULE AND METHODS FOR MANUFACTURING SAME

(71) Applicant: NINGBO SUNNY OPOTECH CO., LTD., Yuyao (CN)

(72) Inventor: Heng Jiang, Yuyao (CN)

(73) Assignee: NINGBO SUNNY OPOTECH CO., LTD, Yuyao (CN)

( * ) Notice: Subject to any disclaimer, the term of this patent is extended or adjusted under 35 U.S.C. 154(b) by 988 days.

(21) Appl. No.: 17/270,257

(22) PCT Filed: Jul. 16, 2019

(86) PCT No.: PCT/CN2019/096133
§ 371 (c)(1),
(2) Date: Feb. 22, 2021

(87) PCT Pub. No.: WO2020/042788
PCT Pub. Date: Mar. 5, 2020

(65) Prior Publication Data
US 2021/0341703 A1    Nov. 4, 2021

(30) Foreign Application Priority Data
Aug. 31, 2018   (CN) .......................... 201811010455.6

(51) Int. Cl.
*G02B 7/02*    (2021.01)
*G02B 3/14*    (2006.01)
(52) U.S. Cl.
CPC ............... *G02B 7/025* (2013.01); *G02B 3/14* (2013.01); *G02B 7/021* (2013.01)

(58) Field of Classification Search
CPC .......... G02B 7/025; G02B 3/14; G02B 7/021; G02B 7/023
See application file for complete search history.

(56) References Cited

U.S. PATENT DOCUMENTS 5,570,237 A     10/1996  Sato
2009/0045476 A1  2/2009  Peng et al.
(Continued)

FOREIGN PATENT DOCUMENTS

CN   101056355 A   10/2007
CN   101389543 A    2/2009
(Continued)

OTHER PUBLICATIONS

European Communication pursuant to Article 94(3) EPC for European Application No. 19853381.2, dated Mar. 31, 2023.
(Continued)

*Primary Examiner* — Christopher W Raimund
(74) *Attorney, Agent, or Firm* — Birch, Stewart, Kolasch & Birch, LLP

(57) ABSTRACT

Manufacturing methods for a multi-lens assembly and a camera module with a multi-lens assembly, and the multi-lens assembly and the camera module with a multi-lens assembly manufactured by the corresponding methods are provided. A method for manufacturing a multi-lens assembly includes the following steps: connecting a first lens and a second lens by using first glue; providing an air escape hole; curing the first glue through baking, so that expanded gas is discharged from the air escape hole; and after the first glue is completely cured, sealing the air escape hole by using second glue that can be completely cured without baking.

11 Claims, 5 Drawing Sheets

(56) References Cited

U.S. PATENT DOCUMENTS

| | | | |
|---|---|---|---|
| 2017/0041515 A1 | 2/2017 | Ohara | |
| 2017/0160509 A1* | 6/2017 | Wang | ............... G02B 7/003 |
| 2019/0137724 A1* | 5/2019 | Kim | ............... G02B 7/02 |

FOREIGN PATENT DOCUMENTS

| | | |
|---|---|---|
| CN | 202330830 U | 7/2012 |
| CN | 103217787 A | 7/2013 |
| CN | 203149179 U | 8/2013 |
| CN | 104880802 A | 9/2015 |
| CN | 105445889 A | 3/2016 |
| CN | 207249220 U | 4/2018 |
| CN | 207336891 U | 5/2018 |
| JP | 2011-147006 A | 7/2011 |
| JP | 2020-16704 A | 1/2020 |
| WO | WO 2017/171388 A1 | 10/2017 |

OTHER PUBLICATIONS

Extended European Search Report for European Application No. 19853381.2, dated Aug. 20, 2021.
Chinese Office Action and Search Report for Chinese Application No. 201811010455.6 dated Mar. 18, 2021, with English translation.
International Search Report (PCT/ISA/210) issued in PCT/CN2019/096133, dated Sep. 26, 2019.

\* cited by examiner

MULTI-LENS ASSEMBLY, CAMERA MODULE AND METHODS FOR MANUFACTURING SAME

CROSS-REFERENCE TO RELATED APPLICATIONS

The present application claims the priority of Chinese Patent Applications No. 201811010455.6, filed with the State Intellectual Property Office of China on Aug. 31, 2018, the entire content of which is incorporated herein by reference.

TECHNICAL FIELD

The present application relates to the field of camera modules, and in particular, to a method for manufacturing a multi-lens assembly, a method for manufacturing a camera module comprising a multi-lens assembly, and a multi-lens assembly and a camera module manufactured by the corresponding methods.

TECHNICAL BACKGROUND

With the popularity of mobile electronic devices, the related technologies of camera modules for helping users obtain images (such as videos or images) applied in the mobile electronic devices have been developed and advanced rapidly, and in recent years, the camera modules have been widely applied in many fields such as medical treatment, security and industrial production.

The lens is an important component of the camera module, and directly affects the imaging quality of the camera module. In a multi-lens assembly, glue is used to connect the lens components. Therefore, it is often necessary to bake the lens module to completely cure the glue, thereby achieving the connection. At this time, the air between upper and lower lens components will expand, and the gas expansion will impact the upper and lower lens components, thereby changing relative positions of optical elements of the lens components, resulting in a decrease in optical capabilities. Therefore, it is necessary to add an air escape hole design in the lens module to reduce the adverse influence of baking on the lens. The air escape hole can escape air by setting a through hole in the lens barrel or through the glue with a notch in the drawing, but the addition of the air escape hole will increase the adverse influence of dust and dirt on the lens.

Therefore, how to prevent the air escape hole from bringing dust and dirt to the lens while reducing the adverse influence of baking on the lens module is a problem that needs to be solved in the art.

SUMMARY

According to an implementation, a method for manufacturing a multi-lens assembly comprises the following steps: connecting a first lens and a second lens by using first glue; providing an air escape hole; curing the first glue through baking, so that expanded gas is discharged from the air escape hole; and after the first glue is completely cured, sealing the air escape hole by using second glue that can be completely cured without baking.

According to an implementation, a multi-lens assembly comprises a first lens and a second lens connected by using first glue, wherein the multi-lens assembly has an air escape hole, and the air escape hole is configured to cause expanded gas generated in baking of the first glue to be discharged from the air escape hole and to be sealed by second glue that can be completely cured without baking after the first glue is completely cured.

According to an implementation, a method for manufacturing a camera module with a multi-lens assembly comprises: connecting a second lens to a motor at a fixed height; connecting a first lens to the second lens connected to the motor at the fixed height by using first glue; providing an air escape hole; curing the first glue through baking, so that expanded gas is discharged from the air escape hole; and after the first glue is completely cured, sealing the air escape hole by using second glue that can be completely cured without baking.

According to an implementation, a camera module with a multi-lens assembly comprises: a first lens; and a lens motor assembly, the lens motor assembly comprising a motor and a second lens connected to the motor at a fixed height, wherein the first lens and the second lens are connected by using first glue, the camera module with a multi-lens assembly has an air escape hole, and the air escape hole is configured to cause expanded gas generated in baking to be discharged from the air escape hole and to be sealed by second glue that can be completely cured without baking after the first glue is completely cured.

BRIEF DESCRIPTION OF THE DRAWINGS

The exemplary embodiments are shown in the reference drawings. The embodiments and drawings disclosed herein are to be considered illustrative and not restrictive.

DETAILED DESCRIPTION OF THE EMBODIMENTS

Figure 1:
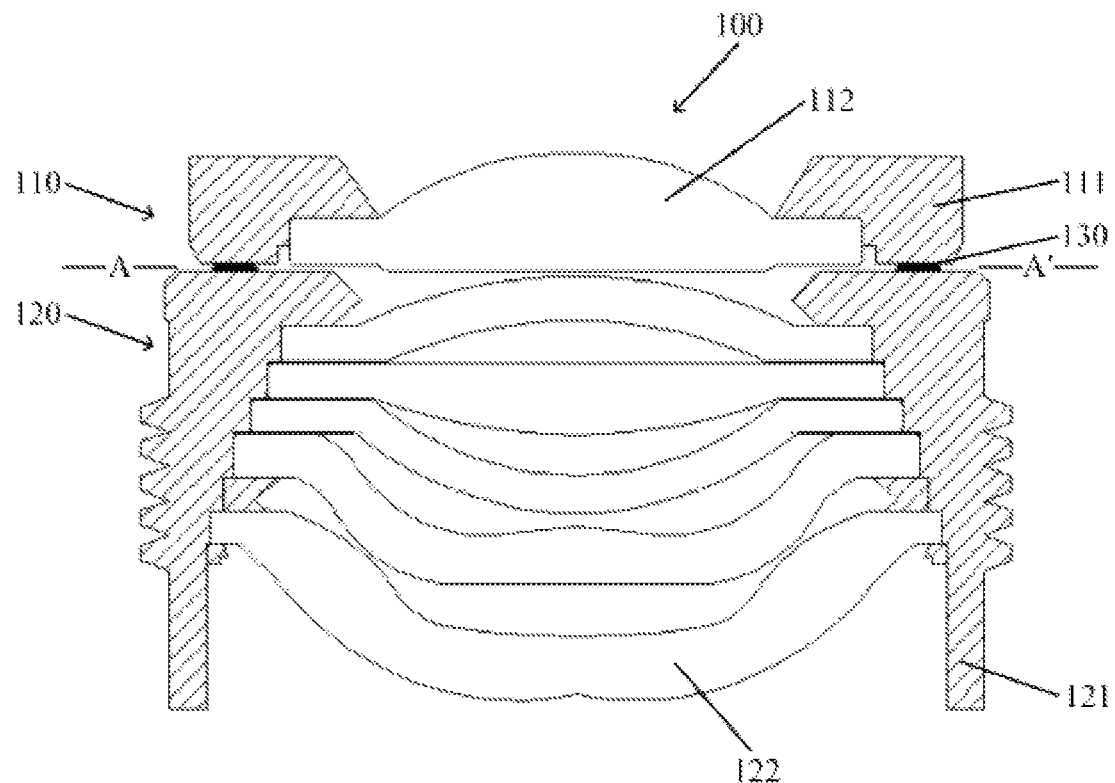
FIG. 1 shows a schematic side view of a multi-lens assembly according to an implementation of the present application.

In order to better understand the present application, various aspects of the present application will be described in more detail with reference to the drawings. It should be understood that the detailed description is merely description of exemplary embodiments of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", etc. are only used to distinguish one feature from another feature, and do not indicate any limitation on the feature. Therefore, without departing from the teachings of the present application, a first main body discussed below may also be referred to as a second main body.

In the drawings, for convenience of explanation, the thickness, size, and shape of the object have been slightly exaggerated. The drawings are only examples and are not drawn strictly to scale.

It should also be understood that the terms "comprising", "comprise", "having", "including" and/or "include" when used in the present description, indicate the existence of stated features, integers, steps, operations, elements and/or components, but does not exclude the presence or addition of one or more other features, integers, steps, operations, elements, components and/or combinations thereof. Furthermore, when an expression such as "at least one of" appears after the list of listed features, it modifies the entire list of listed features, rather than the individual elements in the list. In addition, when describing the implementations of the present application, the use of "may" means "one or more implementations of the present application", and, the term "exemplary" refers to an example or illustration.

As used herein, the terms "substantially", "approximately" and similar terms are used as a term expressing an approximation and not as a term expressing an extent, and are intended to indicate an inherent deviation in a measurement value or calculated value, which will be recognized by those of ordinary skill in the art.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

For ease of understanding, in the following description, a multi-lens assembly of the present application is described with a multi-lens assembly including two upper and lower lenses as an example. However, it should be understood that the multi-lens assembly of the present application is not limited to only having two upper and lower two lenses, but may also have more than two lenses.

FIG. 1 shows a schematic side view of a multi-lens assembly according to an implementation of the present application. As shown in FIG. 1, the multi-lens assembly 100 according to the present application may include a first lens 110 and a second lens 120, wherein the first lens 110 includes a first lens frame 111 and at least one lens sheet 112, and the second lens 120 includes a second lens frame 121 and at least one lens sheet 122. The first lens 110 and the second lens 120 are connected by using first glue 130, and UV irradiation and baking are carried out after the first glue 130 is coated, so that the glue is completely cured, thereby achieving the connection between the first lens 110 and the second lens 120.

Figure 2:
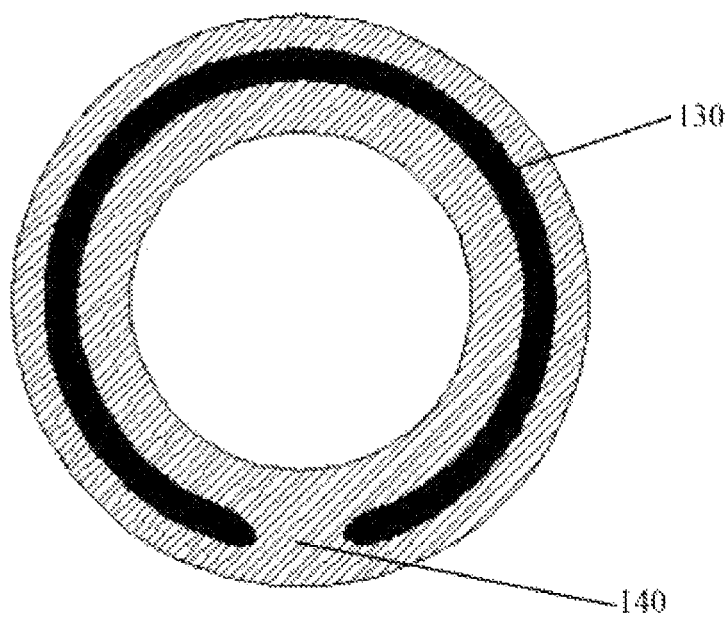
FIG. 2 shows a top view of a cross section along line A-A' of the multi-lens assembly shown in FIG. 1 when an air escape hole is not filled.

FIG. 2 shows a top view of a cross section along line A-A' of the multi-lens assembly shown in FIG. 1 when an air escape hole is not filled. As shown in FIG. 2, the first glue 130 coated between the first lens 110 and the second lens 120 may be coated in a C shape, thereby having an opening 140 that can be used as an air escape hole. It should be understood that although the first glue shown in FIG. 2 is coated in a C shape and has an opening, the first glue may also be coated in any other suitable shape, and can have one or more openings as air escape holes.

Figure 3:
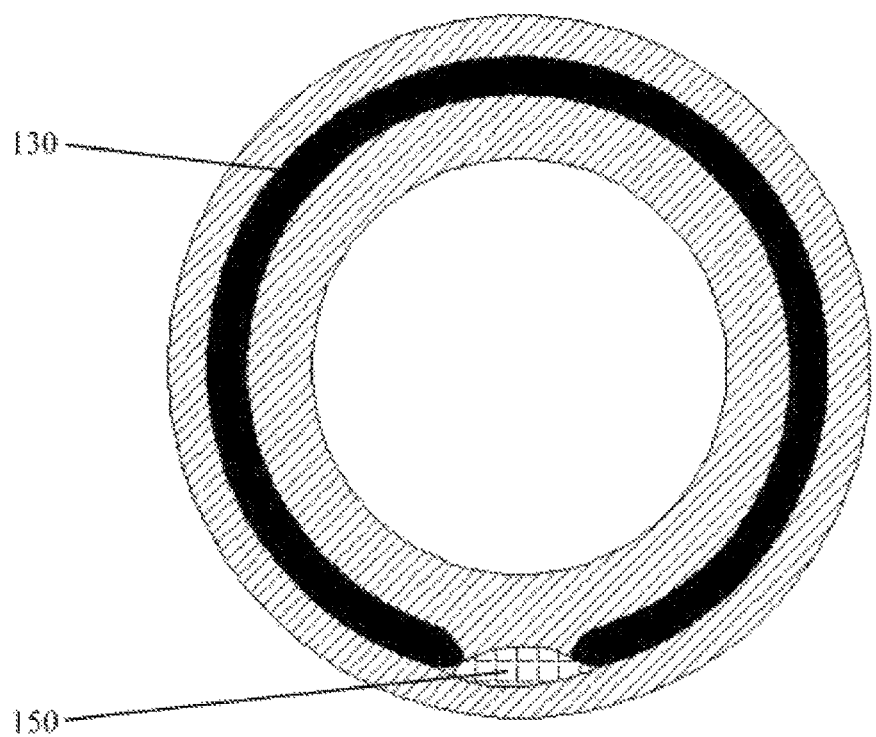
FIG. 3 shows a top view of the cross section along line A-A' of the multi-lens assembly shown in FIG. 1 after the air escape hole is filled.

FIG. 3 shows a top view of the cross section along line A-A' of the multi-lens assembly shown in FIG. 1 after the air escape hole is filled. As shown in FIG. 3, the opening 140 shown in FIG. 2 is filled with second glue 150. According to the present application, filling of the second glue 150 is executed when all the steps that need to be baked have been completed and the first glue has been completely cured. The second glue 150 is glue that can be completely cured without baking, such as UV glue, moisture glue and visible light curing glue.

Figure 4:
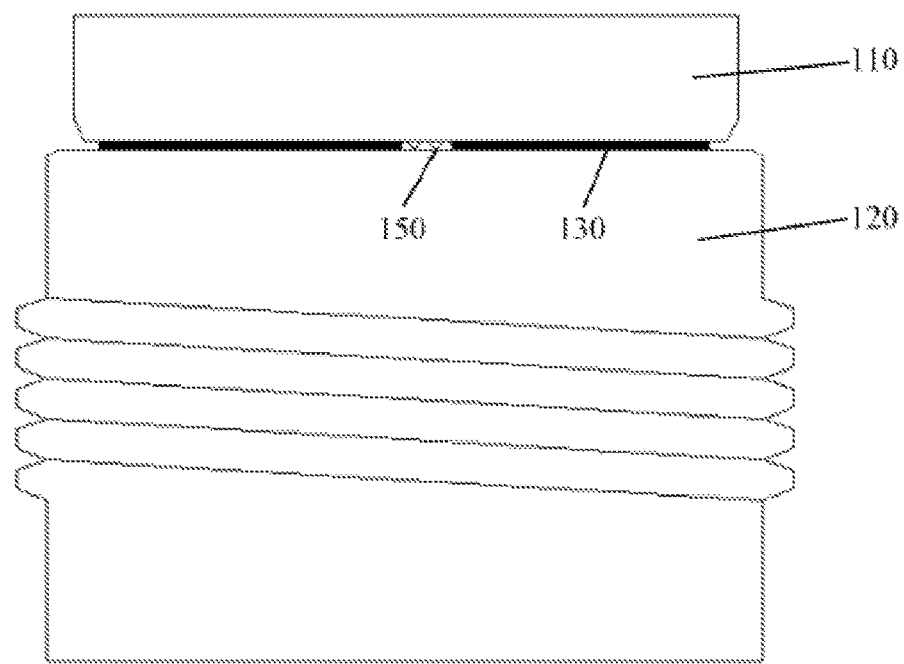
FIG. 4 shows a schematic side view of the multi-lens assembly shown in FIG. 3.

FIG. 4 shows a schematic side view of the multi-lens assembly shown in FIG. 3. It can be seen that between the first lens 110 and the second lens 120, the second glue 150 fills the opening 140 in the first glue 130, thereby sealing the air escape hole formed by the opening 140.

In the exemplary implementation described above, the air escape hole is formed by the opening or notch of the glue coated between the first lens and the second lens. As an option, the air escape hole may also be another hole structure associated with the glue coated between the first lens and the second lens. For example, the air escape hole may be a through hole for discharging the expanded gas a component of the multi-lens assembly. By using the second glue that can be completely cured without baking to seal the air escape hole, dust and dirt are prevented from entering and adversely affecting the lens module.

FIGS. 1 to 4 show a multi-lens assembly, i.e. a split lens. The split lens is produced independently of the camera module with components such as photosensitive elements and motors, and is not actively aligned together with the camera module. For the split lens, after the lens forms an FF fixed focus module or AF adjustable focus module with a photosensitive component, a motor component and the like, and after the glue coated on the module is completely cured, the second glue that can be completely cured without baking, such as UV glue, moisture glue and visible light curing glue, is finally used for glue refilling. The air escape hole is sealed by using the second glue to prevent dust and dirt from entering through the air escape hole. According to the implementation of the present application, preferably, all the steps that need to be baked are completed before the air escape hole is sealed.

According to the implementation of the present application, there is further provided a camera module with a multi-lens assembly, in which at least one lens component is first connected to the motor, and the other lens components are then attached and actively aligned together with the photosensitive component. For example, the second lens in the multi-lens assembly is first connected to the motor, and then the first lens is mounted on the second lens that has been fixedly connected to the motor. For example, for a threaded motor, the second lens component can be screwed into the motor, and after the height is fixed, UV glue is used to dispense between the lens and a motor carrier, so that the second lens and the motor carrier are glued and fixed. For an unthreaded motor, the second lens and the motor carrier can be connected at a fixed height by glue. It should be understood that the connection between the second lens and the motor carrier is not limited to this.

Figure 5:
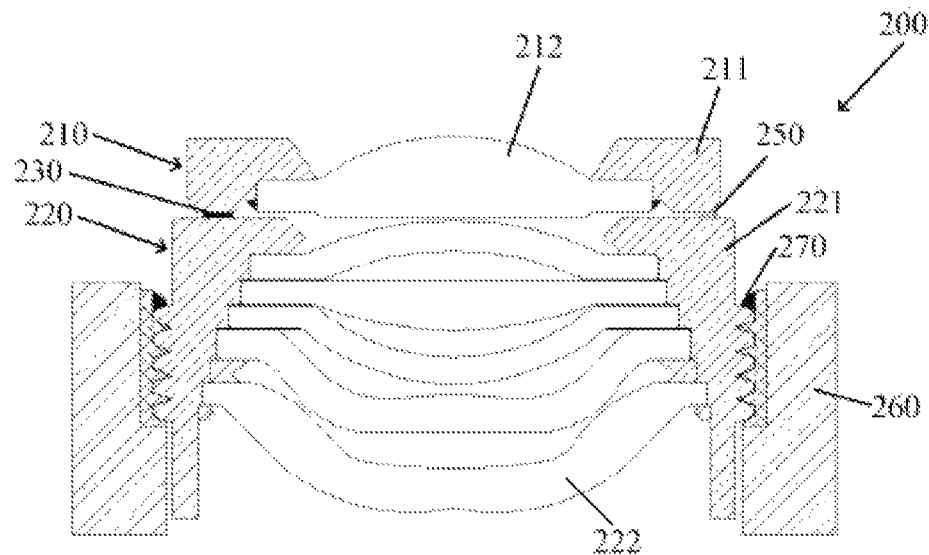
FIG. 5 shows a schematic side view of a camera module with a multi-lens assembly according to an implementation of the present application.

FIG. 5 shows a schematic side view of a camera module with a multi-lens assembly according to an implementation of the present application. As shown in FIG. 5, the camera module 200 may include a first lens 210, a second lens 220, and a motor 260, wherein the first lens 210 includes a first lens frame 211 and at least one lens sheet 212, the second lens 220 includes a second lens frame 221 and at least one lens sheet 222, and the second lens 220 is connected to the motor 260 at a fixed height and fixed by glue 270. The assembly formed by connecting the second lens 220 and the motor 260 at the fixed height may also be referred to as a lens motor assembly. After pre-positioning the first lens 210, the second lens 220 and the motor 260 connected at the fixed height, and an imaging element (not shown) along an optical axis, relative positions between the components are adjusted by an Active Alignment method, and an adhesive is arranged and the adhesive is cured to fix the module. The time for arranging the adhesive may also be before the pre-positioning. For example, the first lens 210 and the second lens 220 may be connected by using first glue 230, and UV irradiation and baking are carried out after the first glue 230 is coated, so that the first glue 230 is completely cured, thereby achieving the connection between the first lens 210 and the second lens 220.

After the above-mentioned Active Alignment, glue coating, baking and curing are completed, glue refilling is finally carried out by using second glue 250 that can be completely cured without baking, such as UV glue, moisture glue and visible light curing glue, to seal the air escape hole formed in the first glue 230, preventing dust and dirt from entering through the air escape hole. It should be understood that the step of using the second glue 250 to seal the air escape hole should be after all the steps that need to be baked, thereby avoiding deformation due to baking after sealing.

In FIG. 5, a glue dispensing gap (i.e. a gap between the first lens 210 and the second lens 220) is higher than an upper surface of a motor 260. In other words, an upper surface of the second lens 220 is higher than the upper surface of the motor 260. In this case, the second glue 250 can be used to dispense between the first lens 210 and the second lens 220 directly from a side surface to seal an exposed air escape hole.

Figure 6:
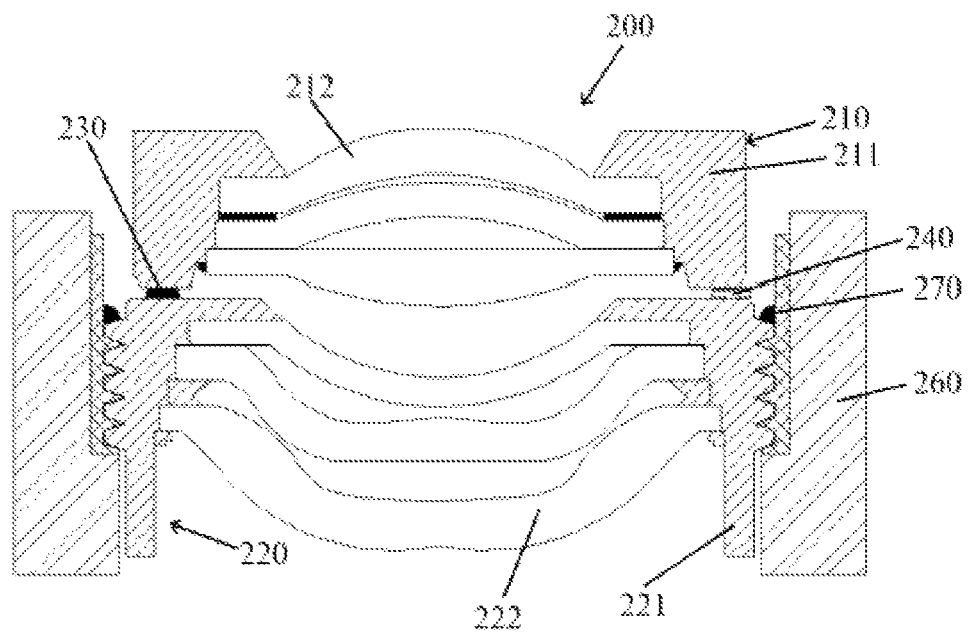
FIG. 6 shows a schematic side view of a camera module with a multi-lens assembly according to an implementation of the present application.

FIG. 6 shows a schematic side view of a camera module with a multi-lens assembly according to an implementation of the present application. In FIG. 6, a glue dispensing gap (i.e. a gap between the first lens 210 and the second lens 220) is lower than an upper surface of a motor 260. In other words, an upper surface of the second lens 220 is lower than the upper surface of the motor 260. In this case, it is impossible to dispense glue between the first lens 210 and the second lens 220 directly from the side surface. Therefore, the second glue 250 can seal the air escape hole 240 by dispensing glue from the gap between the first lens 210 and the motor 260.

Figure 7:
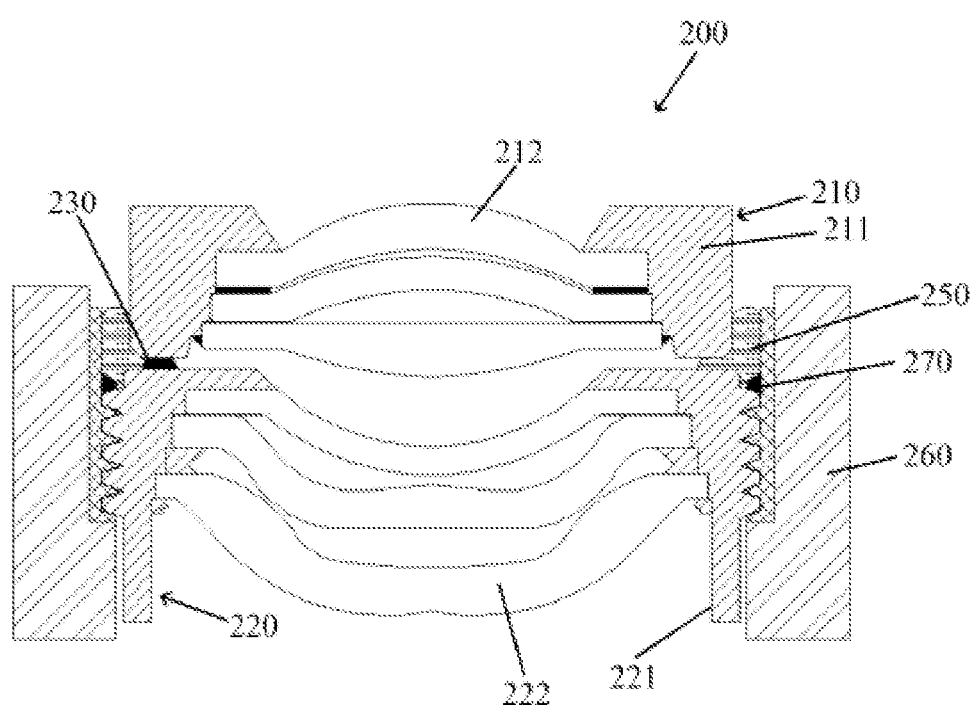
FIG. 7 shows a schematic side view of the camera module with a multi-lens assembly shown in FIG. 6 after the air escape hole is filled.

FIG. 7 shows a schematic side view of the camera module shown in FIG. 6 after the air escape hole is filled. As shown in FIG. 7, the second glue 250 is coated and cured along the gap between the first lens 210 and the motor 260, thereby sealing the air escape hole 240 formed in the first glue 230.

Optionally, a circle of second glue can be coated around the lens when refilling the glue, instead of just sealing the air escape holes, so as to further improve the reliability of the lens while sealing the air escape hole. As shown in the figure, the second glue may also be coated at a position between the first lens 210 and the motor 260 that does not correspond to the air escape hole 240 to strengthen the bonding strength between the first lens 210 and the motor 260. For example, a full circle of second glue may be coated between the first lens 210 and the motor 260 to strengthen the bonding strength between the first lens 210 and the motor 260.

Figure 8:
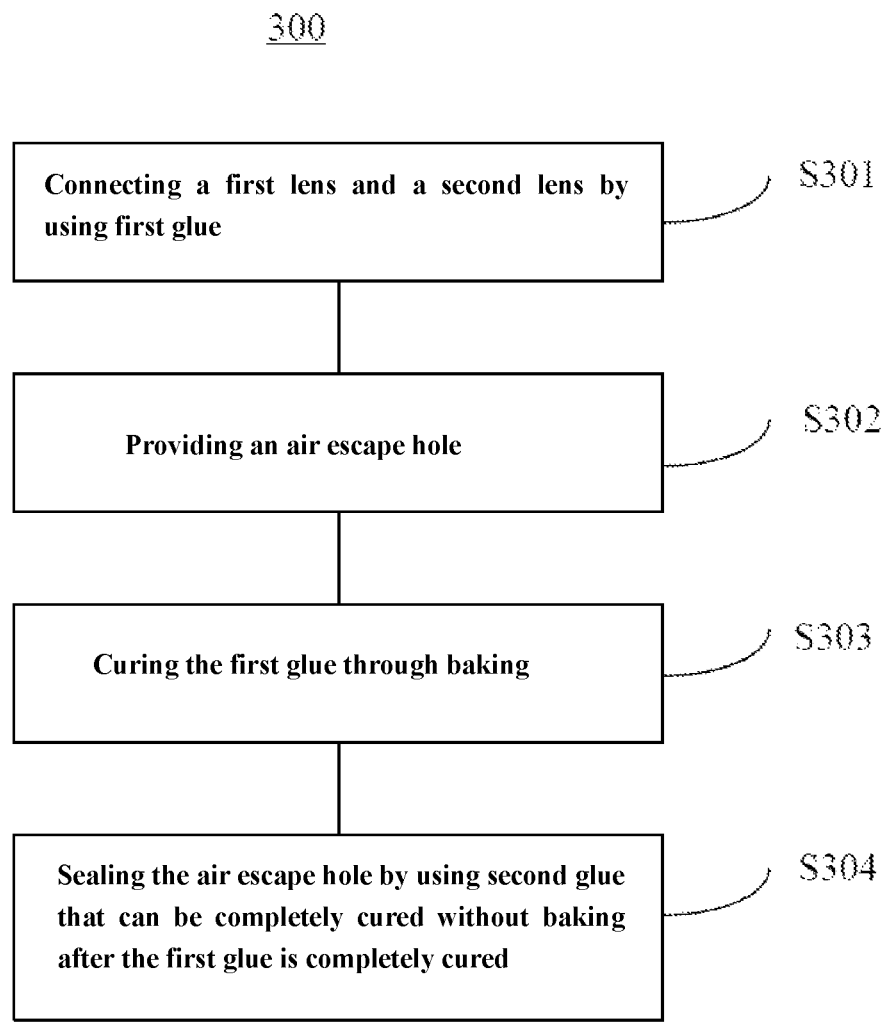
FIG. 8 shows a schematic flowchart of a method for manufacturing a multi-lens assembly according to an implementation of the present application.

FIG. 8 shows a schematic flowchart of a method 300 for manufacturing a multi-lens assembly according to an embodiment of the present application.

As shown in FIG. 8, in step S301, a first lens and a second lens for the multi-lens assembly are connected to each other by using first glue. The first glue is glue usually used in the manufacturing of lens modules, and needs to be cured by baking in a subsequent step. In step S302, an air escape hole is provided in the first glue. For example, the air escape hole may be formed by a notch of glue coated between the first lens and the second lens. Optionally, the air escape hole may also be formed by a through hole for discharging the expanded gas a component of the multi-lens assembly. The arrangement of the air escape hole is used to cause the expanded air to overflow in the subsequent baking step, so as to avoid causing adverse deformation of the lens module. In step S303, the first glue between the first lens and the second lens is cured by baking. As described above, during the baking process of the first glue, the expanded air overflows from the air escape hole. In step S304, after the first glue is completely cured, the air escape hole is filled with second glue that can be completely cured without baking, thereby sealing the air escape hole. Thus, dust and dirt are prevented from entering the air escape hole and adversely affecting the lens module.

In the above exemplary method, it is only described that the first lens and the second lens are connected by glue and the glue is cured by baking. It should be understood that the multi-lens assembly and the camera module with a multi-lens assembly according to the present application may also have other components that need to be connected by glue and cured by baking. In this case, the filling and sealing of the air escape hole with the second glue should be performed after all baking steps are completed.

As described above with reference to FIGS. 5 to 7, the method for manufacturing the camera module with a multi-lens assembly according to the implementation of the present application is similar to the method for manufacturing the multi-lens assembly except that the method for manufacturing the camera module with a multi-lens assembly may further include connecting the second lens to the motor at the fixed height before the step of connecting the first lens and the second lens by using the first glue. When the upper surface of the second lens connected to the motor at the fixed height is higher than the upper surface of the motor, the second glue can be used to seal the air escape hole directly from the side surface between the first lens and the second lens. When the upper surface of the second lens connected to the motor at the fixed height is lower than the upper surface of the motor, the second glue can be used to seal the air escape hole from the gap between the first lens and the motor carrier of the motor.

The Active Alignment described in the present application can adjust the relative positions of lens components in multiple degrees of freedom. The Active Alignment refers to aligning the entire optical system by controlling the alignment of one lens component relative to another lens component according to the measured resolution of the optical system, so that the axes of various lens components are adjusted to be consistent, thereby causing the measured resolution of the optical system to reach a standard. Herein, the axis of the lens component refers to an optical axis of the optical system composed of all lens sheets in the lens component.

The above description is only the preferred implementations of the present application and the explanation of the applied technical principle. It should be understood by those skilled in the art that the scope of protection involved in the present application is not limited to technical solutions formed by specific combinations of the above technical features, and at the same time, should also cover other technical solutions formed by any combination of the above technical features or equivalent features thereof without departing from the concept of the present application. For example, the above features and (but not limited to) the technical features with similar functions disclosed in the present application are replaced with each other to form technical solutions.

What is claimed is:

1. A method for manufacturing a multi-lens assembly, comprising:
   connecting a first lens and a second lens by using first glue, and the second lens is connected to a motor;
   providing an air escape hole, wherein the air escape hole is located between the first lens and the second lens;
   curing the first glue through baking, so that expanded gas generated in the baking of the first glue is discharged from the air escape hole; and
   after the first glue is completely cured, sealing the air escape hole by using second glue that can be completely cured without baking,
   wherein an upper surface of the second lens is lower than an upper surface of the motor, and the second glue is applied from a gap between the first lens and a motor carrier of the motor, to seal the air escape hole, and the second glue connects the first lens, the second lens, and the motor.

2. The method of claim 1, wherein the step of sealing the air escape hole by using the second glue is performed after all baking steps in a manufacturing process of the multi-lens assembly are completed.

3. The method of claim 1, wherein the air escape hole is formed by a notch of the first glue coated between the first lens and the second lens.

4. The method of claim 1, wherein the air escape hole is formed by a through hole in a component of the multi-lens assembly.

5. The method of claim 1, wherein the second glue can be cured by at least one of UV, moisture, and visible light.

6. A method for manufacturing a camera module with a multi-lens assembly, comprising:
   connecting a second lens to a motor;
   connecting a first lens to the second lens connected to the motor by using first glue;
   providing an air escape hole, wherein the air escape hole is located between the first lens and the second lens;
   curing the first glue through baking, so that expanded gas generated in the baking of the first glue is discharged from the air escape hole; and
   after the first glue is completely cured, sealing the air escape hole by using second glue that can be completely cured without baking,
   wherein an upper surface of the second lens is lower than an upper surface of the motor. and the second glue is applied from a gap between the first lens and a motor carrier of the motor, to seal the air escape hole, and the second glue connects the first lens, the second lens, and the motor.

7. The method of claim 6, wherein the step of sealing the air escape hole by using the second glue is performed after all baking steps in a manufacturing process of the camera module with a multi-lens assembly are completed.

8. The method of claim 6, wherein the air escape hole is formed by a notch of the first glue coated between the first lens and the second lens.

9. The method of claim 6, wherein the air escape hole is formed by a through hole in a component of the camera module with a multi-lens assembly.

10. The method of claim 6, wherein the second glue can be cured by at least one of UV, moisture, and visible light.

11. The method of claim 6, further comprising:
    the second glue is coated to a region between the first lens and the motor other than a region corresponding to a position of the air escape hole to increase bonding strength of the first lens and the motor.

* * * * *